(12) United States Patent
Bliss et al.

(10) Patent No.: US 7,899,968 B2
(45) Date of Patent: *Mar. 1, 2011

(54) USB INTEGRATED BIDIRECTIONAL DIGITAL ISOLATOR CHANNEL ACROSS AN INTERFACE BETWEEN TWO USB DEVICES

(75) Inventors: David Bliss, Loomis, CA (US); Sajol Ghoshal, El Dorado Hills, CA (US)

(73) Assignee: Akros Silicon Inc., Folsom, CA (US)

( * ) Notice: Subject to any disclaimer, the term of this patent is extended or adjusted under 35 U.S.C. 154(b) by 19 days.

This patent is subject to a terminal disclaimer.

(21) Appl. No.: 11/881,281

(22) Filed: Jul. 26, 2007

(65) Prior Publication Data

US 2009/0031056 A1 Jan. 29, 2009

(51) Int. Cl.
*G06F 13/00* (2006.01)

(52) U.S. Cl. .................. 710/305; 710/32; 710/33; 710/59; 710/110; 710/31; 710/36

(58) Field of Classification Search ............ 710/31–33, 710/59, 305, 110, 36
See application file for complete search history.

(56) References Cited

U.S. PATENT DOCUMENTS

| | | | |
|---|---|---|---|
| 6,526,468 B1 * | 2/2003 | Larochelle et al. .......... 710/305 |
| 6,595,929 B2 * | 7/2003 | Stivoric et al. ............. 600/549 |
| 6,820,160 B1 * | 11/2004 | Allman ..................... 710/305 |
| 7,289,553 B2 * | 10/2007 | Yukutake et al. ........... 375/222 |
| 7,365,454 B2 * | 4/2008 | Morrow .................... 307/140 |
| 7,610,422 B2 * | 10/2009 | Bliss et al. ................ 710/110 |
| 7,689,724 B1 * | 3/2010 | Hatton et al. .............. 709/253 |
| 7,765,344 B2 * | 7/2010 | Wright ..................... 710/62 |
| 2006/0122529 A1 * | 6/2006 | Tsau ....................... 600/544 |
| 2006/0265540 A1 * | 11/2006 | Mass et al. ................ 710/305 |
| 2007/0055166 A1 * | 3/2007 | Patil ....................... 600/509 |
| 2008/0181316 A1 * | 7/2008 | Crawley et al. ............ 375/258 |
| 2008/0301347 A1 * | 12/2008 | Bandholz et al. ........... 710/305 |

* cited by examiner

*Primary Examiner*—Tammara Peyton
(74) *Attorney, Agent, or Firm*—DLA Piper LLP (US)

(57) ABSTRACT

An interface between USB devices employs isolation techniques to provide electrical isolation of a USB signal for transmission of the USB signal between the devices. Unidirectional isolator channels are utilized to transmit the USB signals, and a selection of an isolator channel operating in an intended direction is performed by either direction control logic or a USB hub function. Logic may be employed to detect a device attempting to initiate a USB signal. The logic operates to enable a transmitter on a receiving side and isolate the USB signal through an isolator channel operating in a transmission direction.

8 Claims, 5 Drawing Sheets

High Speed USB Isolator Component 400 (with isolation barrier between the USB hub controller and the PHY)

USB INTEGRATED BIDIRECTIONAL DIGITAL ISOLATOR CHANNEL ACROSS AN INTERFACE BETWEEN TWO USB DEVICES

BACKGROUND

The present invention relates generally to methods and systems for determining consumer perception of certain brands in the market. In particular, it is a method and system for determining the effectiveness of advertising.

Isolation of digital signals communicated between devices is needed to reduce safety hazards as well as for noise robustness factors. Shock and fire hazards may result from digital signals that are not isolated. Additionally, excess noise may be introduced into the digital signals as a result of insufficient isolation. Thus, electrical isolation of digital signals being transmitted between devices, while still allowing the digital signal to be transmitted across an interface between the devices, is a necessary requirement.

Interface components, operating to communicate digital signals between devices, may be utilized to isolate the digital signals. Isolator channels are components for electrically isolating digital signals and may be employed in interface components for such a purpose. Isolator channels are uni-directional components, while digital signals may be bi-directional. Thus, one isolator channel may be utilized to transmit a digital signal in one direction, while a second isolator channel is needed to transmit the digital signal in an opposite direction. For example, the first isolator channel may be used for communication from a transmitter to a receiver, while the second isolator channel may be used for communication from the receiver to the transmitter.

When a digital signal reaches an interface between devices, it is necessary to determine the intended direction of the signal to allow for an isolator channel operating in the intended direction to be utilized to electrically isolate the digital signal. Thus, a need exists for a process and component to manage and control the direction of the signal across the interface.

SUMMARY

A digital signal, such as a universal serial bus (USB) signal, is communicated between two or more devices, such as USB devices, across an interface. The interface operates to receive, isolate, and transmit the digital signal. Isolator channels or isolation techniques are employed at the interface to electrically isolate the devices while still allowing the transmission of the digital signal. The isolator channels or isolation techniques are managed by either direction control logic or a USB hub function, to control the direction of the signal across the interface.

The direction logic may detect an initiation of a transmission of the signal and enable a transmitter on the receiving side. For High Speed USB interfaces, a hub controller operates to determine an intended direction of a USB signal and utilize an isolator operating in the intended direction.

BRIEF DESCRIPTION OF THE DRAWINGS

The foregoing summary and the following detailed description are better understood when read in conjunction with the appended drawings. Exemplary embodiments are shown in the drawings; however, it is understood that the embodiments are not limited to the specific methods and instrumentalities depicted herein. In the drawings.

DETAILED DESCRIPTION

Figure 1:
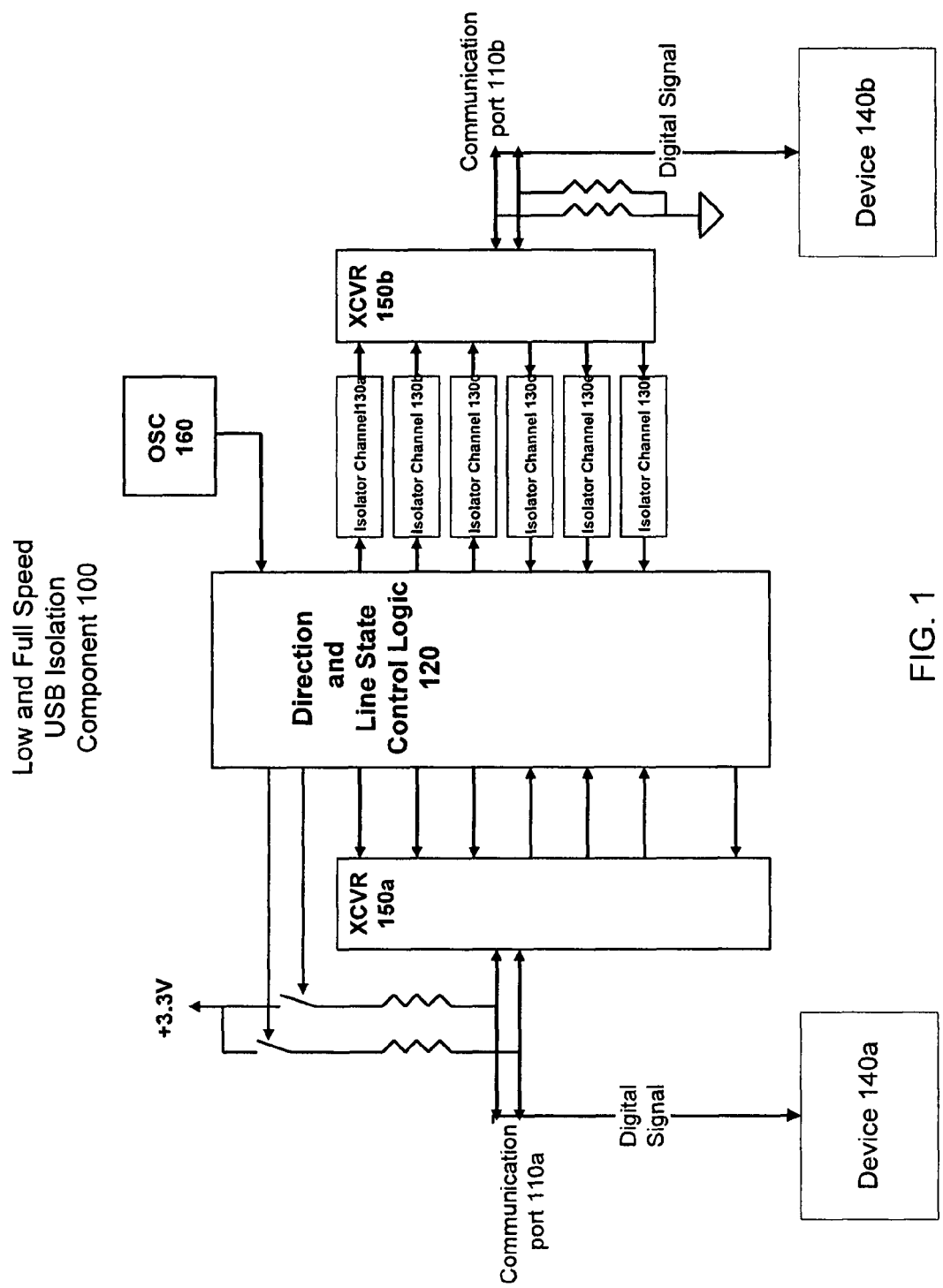
FIG. 1 is a diagram illustrating an exemplary interface component that communicates and electrically isolates a digital signal between two low speed or full speed USB devices.

FIG. 1 is a diagram illustrating an exemplary low and full speed USB interface component 100 that communicates and electrically isolates bi-directional digital signals between two devices. This exemplary component 100 may be utilized in low and full speed USB applications, such as USB 1.1. The component 100 may be utilized between USB devices, such as between a USB host and a USB device or between two USB hosts.

The low and full speed USB isolation component 100 may operate to communicate and electrically isolate a digital signal between two devices, such as device 140a and device 140b. Bi-directional communication ports 110a and 110b may act as the link between the devices 140a and 140b and the interface component 100. The bi-directional communication ports 110a and 110b may operate to transmit and receive the digital signal between the two devices 140a and 140b. The digital signal may be a USB data signal, for example. Other types of digital signals may be communicated between the devices 140a and 140b across the low and full speed USB isolation component 100. Moreover, the USB isolation component 100 may include additional bidirectional communication ports. Two ports, 110a and 110b, are shown only as an exemplary embodiment, as illustrated in FIG. 1.

USB isolation component 100 may isolate USB low and full speed interfaces by examining the data stream between two devices 140a and 140b, which may be USB devices. A transition from an idle state to a non-idle state in a digital signal may serve as an indication that a frame is beginning (a transmission is being initiated by device 140a or 140b), which may thus indicate the direction of transmission of the digital signal. An isolator channel operating in the desired direction may then be utilized to electrically isolate the digital signal in the direction of transmission.

Isolator channels 130 may be uni-directional isolator channels that operate to provide high-volt electrical isolation to digital signals. The means of isolation may be, but are not limited to, capacitive, magnetic, optical, or acoustical means.

Transceivers 150a and 150b operate to transmit and receive digital signals from devices 140a and 140b. For example, transceivers 150a and 150b may transmit and receive USB signals, from USB devices. Transceivers 150a and 150b may be USB-specific transceivers. Oscillator 160 may operate at a sufficiently high frequency to meet the timing requirements of the USB protocol.

Direction/line state control logic 120 may be used to determine a direction of the digital signal. The digital signal may be a bi-directional digital signal, for example a bi-directional USB signal. Upon determination of the direction of the digital signal, direction/line state control logic 120 may provide the digital signal to one of the isolator channels 130a-130f operating in the determined direction. Six isolator channels, 130a-130f, are shown in the exemplary embodiment illustrated in FIG. 1. However, fewer or more isolator channels 130 may be included depending on the particular application.

To determine the direction of the digital signal, direction/line state control logic 120 monitors the data stream. Direction/line state control logic 120 detects a change in the digital signal from an idle state to a non-idle state. When a change is detected, direction/line state control logic 120 may determine the device 140a or 140b transmitting the digital signal. Direction/line state control logic 120 may then operates to enable the transceiver 150a or 150b to drive the device 140a or 140b receiving the digital signal. The transceiver 150a or 150b may then transmit the digital signal to the receiving device 140a or 140b.

Direction/line state control logic 120 may further transmit the digital signal to one of the isolator channels 130a-103f that operates in the determined transmission direction of the digital signal. Moreover, direction/line state control logic 120 may perform subsequent monitoring operations to determine the end of transmission of the digital signal. When the transmission is complete, the transceiver 150a or 150b driving the receiving device 140a or 140b may then be disabled.

For example, while monitoring the data stream, direction/line state control logic 120 may detect a change from an idle state to a non-idle state in a digital signal from device 140a. With this detection, it may be determined that the digital signal is being transmitted from device 140a to device 140b. Direction/line state control logic 120 may transmit the digital signal to an isolator channel 130a-130f operating in the direction from device 140a to device 140b. After isolation of the digital signal, direction/line state control logic 120 may then operate to enable the transceiver 150b associated with device 140b to transmit the isolated digital signal to device 140b. A subsequent monitoring operation may indicate the end of transmission of the digital signal. Direction/line state control logic 120 may then disable the transceiver 150b driving the device 140b.

Figure 2:
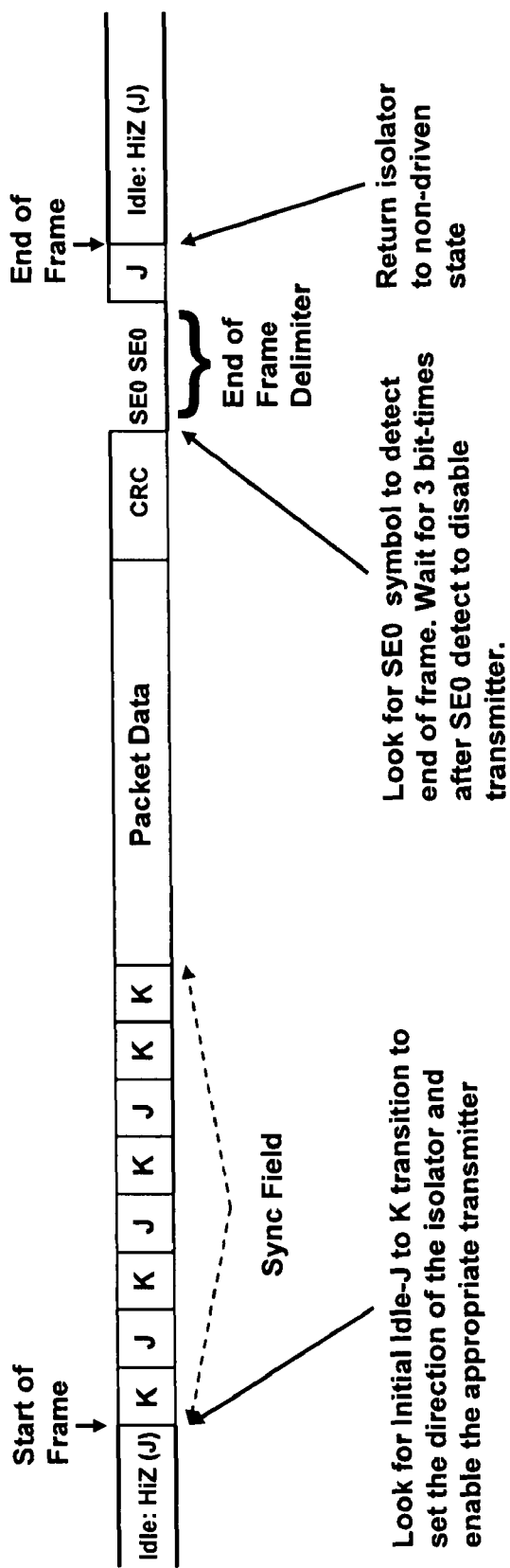
FIG. 2 is a timing diagram illustrating an exemplary frame of a digital signal communicated across an interface between two devices.

FIG. 2 is a timing diagram illustrating an exemplary frame of the digital signal being communicated across the low and full speed USB isolation component 100 of FIG. 1. An idle (J) transition to a non-idle (K) transition may be detected by direction/line state control logic 120. Upon detection of the transition, the appropriate transceiver 150a or 150b is enabled to drive the receiving device 140a or 140b, the digital signal is isolated by an isolator channel 130 operating in the transmission direction of the digital signal, and the digital signal is transmitted to the receiving device 140a or 140b. The end of the transmission may be determined by detecting an SE0 symbol. The direction/line state control logic 120 may wait a pre-determined number of cycles, such as 3 bit-times, before disabling the transceiver and returning the isolator channel 130 to a non-driven state.

Figure 3:
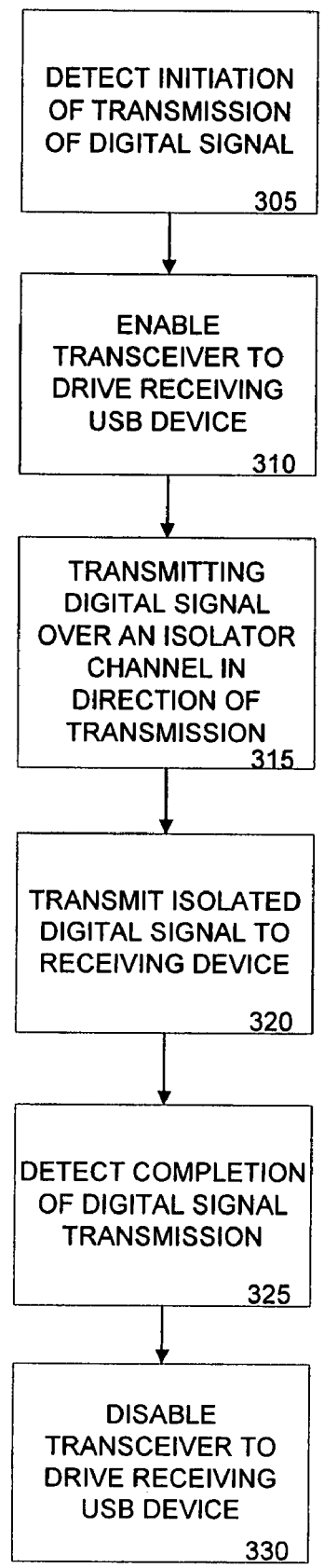
FIG. 3 is a flowchart illustrating an additional exemplary method of communicating a digital signal across an isolated USB interface.

FIG. 3 is a flowchart illustrating an additional exemplary method of communicating a digital signal across a USB isolation component 100 of FIG. 1. The USB isolation component 100 operates to isolate the digital signal to provide electrical isolation between the devices 140a and 140b. The digital signal is being transmitted from a transmitting device to a receiving device, and the devices may be any USB devices 140a or 140b or other devices capable of transmitting and receiving digital data.

At 305, an initiation for transmission of the digital signal from the transmitting device is detected. The detection may be done by monitoring the data stream of devices 140a and 140b. A change from an idle to a non-idle state may signify transmission of a digital signal. The detection may be performed by direction/line state control logic 120.

At 310, upon detection of the transition, direction/line state control logic 120 operates to enable the transceiver 150a or 150b to drive the receiving device. For example, it may be detected by a change in transition of a digital signal that device 140a is transmitting the digital signal. Device 140b may then receive the digital signal. To achieve this transmission, transceiver 150b, operating for device 140b, is enabled to perform the transmission to device 140b.

At 315, the digital signal is transmitted in the detected and enabled direction. The transmission may include utilizing an isolator channel 130a-130f operating in the direction of the digital signal transmission. The uni-directional isolator channel 130 isolates the digital signal to provide electrical isolation between the device 140a and 140b. Direction/line state control logic 120 utilizes a uni-directional isolator channel 130 operating in the desired direction.

At 320, the isolated digital signal is transmitted to the receiving device 140a or 140b from the enabled transceiver 150a or 150b.

At 325, a completion of the digital signal transmission is detected by, for example, direction/line state control logic 120. When the digital signal has been sent, the state of the signal changes from a non-idle state to an idle state.

At 330, the transceiver driving the receiving device is disabled. Continuing the above example, transceiver 150b, transmitting the digital signal to device 140b, is disabled upon completion of the transmission. The disablement may occur after a predetermined number of cycles elapse after the detection.

Figure 4:
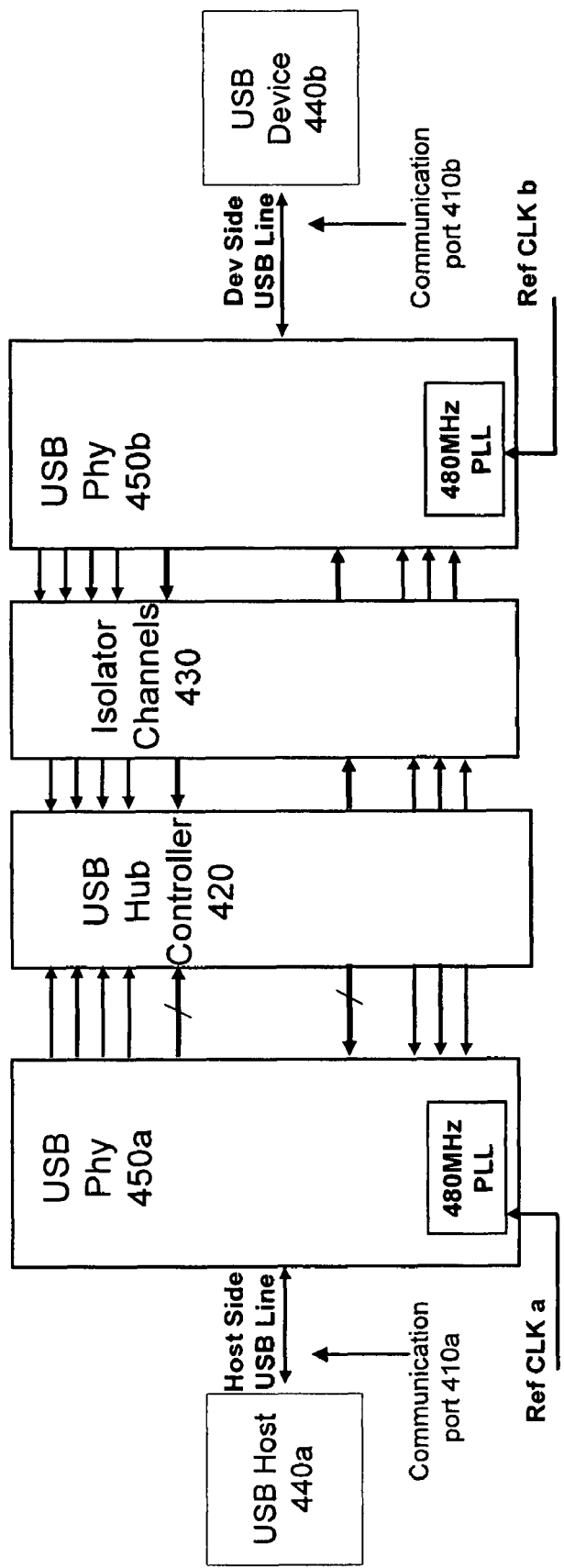
FIG. 4 is a diagram illustrating an exemplary isolator component for providing electrical isolation between a USB host and a USB device.

FIG. 4 is a diagram illustrating an exemplary high speed USB isolator component 400 for providing electrical isolation between a High Speed USB host 440a and a USB device 440b. A USB signal may be communicated between the USB host 440a and the USB device 440b. This exemplary component 400 may be utilized in USB applications, such as USB 2.0.

The USB isolator component 400 may include bi-directional communication ports 410a and 410b for transmitting and receiving the USB signal between the two devices to USB physical layer components 450a and 450b. A USB hub controller 420 may be connected to the USB physical layer components 450a and 450b for the purposes of retiming and repeating the USB signals and for determining a transmission direction of the USB signal. The USB hub controller 420 may be a multi-port device that allows for the connection of multiple devices. The USB hub controller 420 may determine the transmission direction of a digital signal to convey to isolator channels 430.

The isolator channels 430 may isolate and transmit the USB signal in the determined direction. The isolator channels 430 may include multiple uni-directional isolator channels that operate to provide high-volt electrical isolation to digital signals.

The USB hub controller 420 serves as a repeater which serves to receive, retime, and repeat the USB signal. The signals in and out of the hub controller 420 are all uni-directional and can be easily isolated with uni-directional isolators, such as the isolator channels 430. For this configuration, as shown in FIG. 4, separate direction control logic is not required as the hub function inherently provides the direction logic.

Figure 5:
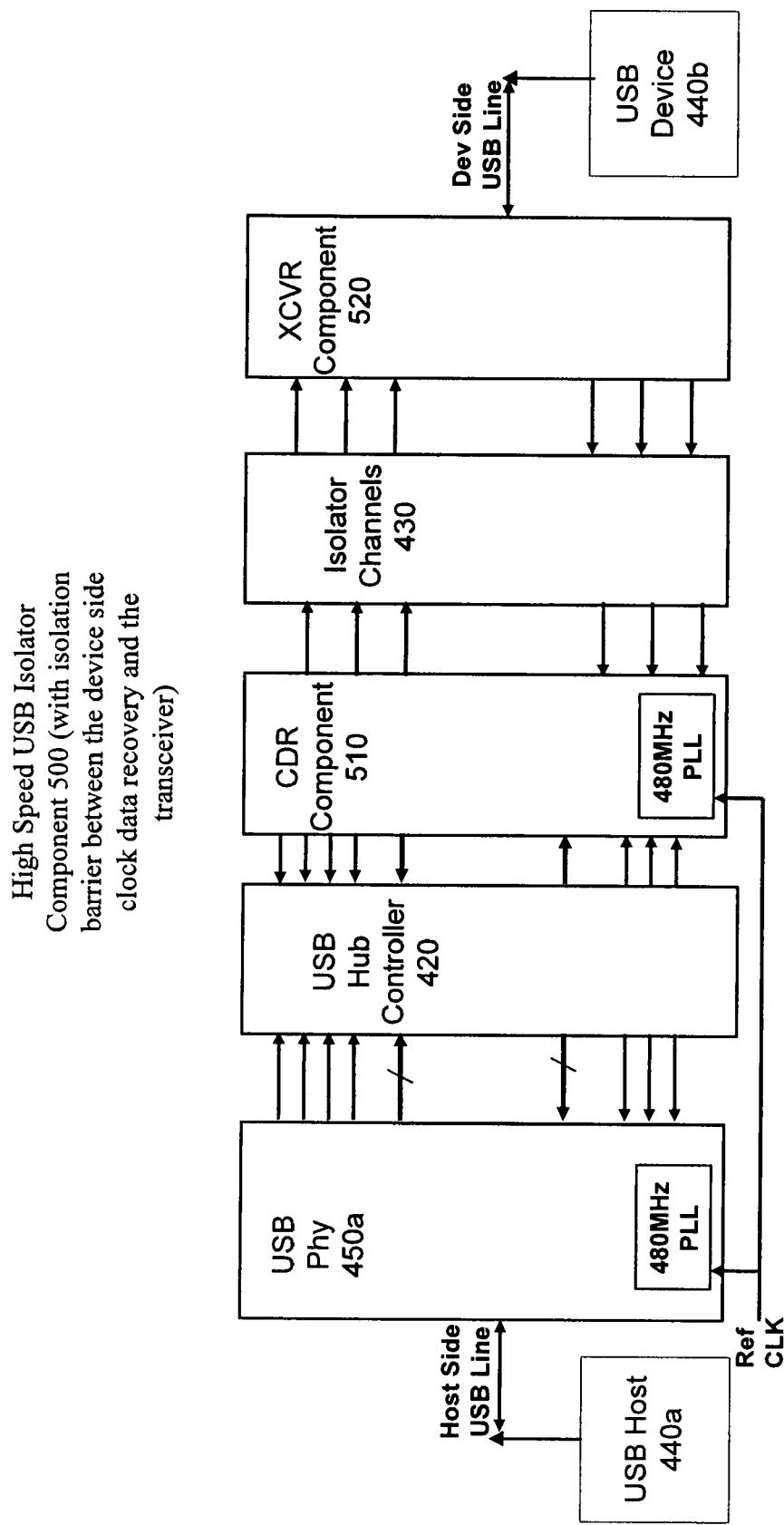
FIG. 5 is a diagram illustrating an additional exemplary isolator component for providing electrical isolation between a USB host and a USB device.

In an exemplary embodiment shown in FIG. 5, a second high speed USB isolator component 500 includes a physical layer component 450a as well as a clock data recovery (CDR) component 510 and a transceiver (XCVR) component 520. In this embodiment, the isolator channels 430 are connected between the CDR component 510 and the XCVR component 520. However, the USB hub controller 420 continues to inherently provide the USB digital signal direction and determine the transmission direction to convey to the isolator channels 430. The isolator channels 430 may isolate and transmit the USB digital signal in the determined direction as described above with relation to FIG. 4. The CDR component 510 and the XCVR component 520 together may form the physical layer component 450b shown in FIG. 4. In some applications, it may be necessary or beneficial to split the physical layer component 450b, as shown in FIG. 5, into the CDR component 510 and the XCVR component 520. Alternatively, the physical layer component 450a may be split, or both components 450a and 450b may be split.

The foregoing examples are provided merely for the purpose of explanation and are in no way to be construed as limiting. While reference to various embodiments are shown, the words used herein are words of description and illustration, rather than words of limitation. Further, although reference to particular means, materials, and embodiments are shown, there is no limitation to the particulars disclosed herein. Rather, the embodiments extend to all functionally equivalent structures, methods, and uses, such as are within the scope of the appended claims.

The invention claimed is:

1. A method of communicating and isolating a digital signal across an interface between two devices, the method comprising:
   receiving the digital signal at the interface;
   analyzing the digital signal at the interface to detect an initiation for a transmission of the digital signal from a transmitting device to a receiving device to determine an intended direction of the digital signal;
   transmitting the digital signal to an isolator channel configured to isolate the digital signal in the intended direction of the digital signal by monitoring the digital signal for a transition from an idle state to a non-idle state;
   isolating the digital signal at the isolator channel;
   enabling a receiving device transceiver for receiving the digital signal; and
   transmitting the isolated digital signal in the intended direction of the digital signal to the receiving device via the receiving device transceiver.

2. The method of claim 1, further comprising:
   analyzing the digital signal at the interface to detect a completion of the transmission of the digital signal; and
   disabling the receiving device transceiver.

3. The method of claim 2, wherein analyzing the digital signal at the interface to detect a completion of the transmission of the digital signal comprises monitoring the digital signal for a transition from a non-idle state to an idle state.

4. The method of claim 2, wherein disabling the receiving device transceiver comprises disabling the receiving device transceiver after a predetermined number of cycles elapse after the detection of the completion of the transmission of the digital signal.

5. The method of claim 1, wherein one of the two devices is a USB host, and wherein the second of the two devices is a USB device.

6. One or more integrated circuit devices having a process embodied in said integrated circuit device, said process performing a method of isolating a digital signal across a USB interface between two USB devices, the method comprising:
   receiving the digital signal at the interface;
   analyzing the digital signal at the interface to detect an initiation for a transmission of the digital signal from a transmitting device to a receiving device by monitoring the digital signal for a transition from an idle state to a non-idle state;
   determining a transmission direction of the digital signal based upon the analysis and the detection of the initiation for the transmission;
   transmitting the digital signal to an isolator channel configured to isolate the digital signal in the determined transmission direction;
   isolating the digital signal at the isolator channel;
   enabling a receiving device transceiver for receiving the digital signal; and
   transmitting the isolated digital signal in the determined transmission direction to the receiving device via the receiving device transceiver.

7. The one or more integrated circuit device of claim 6, wherein said process performs the further method of:
   disabling the receiving device transceiver upon completion of the transmission of the digital signal.

8. The one or more integrated circuit device of claim 7, wherein said process performs the further method of:
   detecting completion of the transmission of the digital signal by monitoring the digital signal for a transition from a non-idle state to an idle state.

* * * * *